United States Patent
Hui et al.

(10) Patent No.: US 8,085,768 B1
(45) Date of Patent: Dec. 27, 2011

(54) SYSTEM AND METHOD FOR MANAGING A LIST OF ENTRIES CONTAINING ROUTING INFORMATION

(75) Inventors: Jonathan W Hui, Foster City, CA (US); Alec Woo, Union City, CA (US); David E Culler, Berkeley, CA (US)

(73) Assignee: Cisco Technology Inc., San Jose, CA (US)

( * ) Notice: Subject to any disclaimer, the term of this patent is extended or adjusted under 35 U.S.C. 154(b) by 137 days.

(21) Appl. No.: 12/290,843

(22) Filed: Nov. 3, 2008

Related U.S. Application Data

(60) Provisional application No. 61/001,520, filed on Nov. 1, 2007, provisional application No. 61/001,634, filed on Nov. 1, 2007.

(51) Int. Cl.
    H04L 12/28 (2006.01)
(52) U.S. Cl. .......... 370/389; 379/242; 710/316
(58) Field of Classification Search .......... 370/389, 370/238, 338, 248; 709/223, 241
See application file for complete search history.

(56) References Cited

U.S. PATENT DOCUMENTS

| | | | |
|---|---|---|---|
| 6,260,072 B1 * | 7/2001 | Rodriguez-Moral | 709/241 |
| 6,584,500 B1 * | 6/2003 | Arkko | 709/223 |
| 6,606,303 B1 * | 8/2003 | Hassel et al. | 370/238 |
| 7,002,917 B1 * | 2/2006 | Saleh | 370/238 |
| 7,058,016 B1 * | 6/2006 | Harper | 370/238 |
| 2002/0191573 A1 * | 12/2002 | Whitehill et al. | 370/338 |
| 2004/0116141 A1 | 6/2004 | Loven et al. | |
| 2004/0219922 A1 | 11/2004 | Gage et al. | |
| 2005/0249122 A1 | 11/2005 | Wheeler et al. | |
| 2006/0215588 A1 | 9/2006 | Yoon | |
| 2008/0095075 A1 | 4/2008 | Monier | |
| 2009/0190481 A1 * | 7/2009 | Kobayashi et al. | 370/248 |

OTHER PUBLICATIONS

Non-final Office Action issued Jul. 15, 2010 in U.S. Appl. No. 12/290,848, 14 pages.
Non-final Office Action issued Feb. 16, 2011 in U.S. Appl. No. 12/290,848, 12 pages.
Non-final Office Action issued May 26, 2010 in U.S. Appl. No. 12/290,822, 12 pages.
Final Office Action issued Feb. 16, 2011 in U.S. Appl. No. 12/290,822, 15 pages.

* cited by examiner

*Primary Examiner* — Dang Ton
*Assistant Examiner* — Lionel Preval
(74) *Attorney, Agent, or Firm* — Fish & Richardson P.C.

(57) ABSTRACT

A system and method adds and manages entries on a list of entries of routing information to allow the top entry to be used for routing to a destination corresponding to the list. Costs of a wireless link may be a function of the success rate experienced on that wireless link.

21 Claims, 6 Drawing Sheets

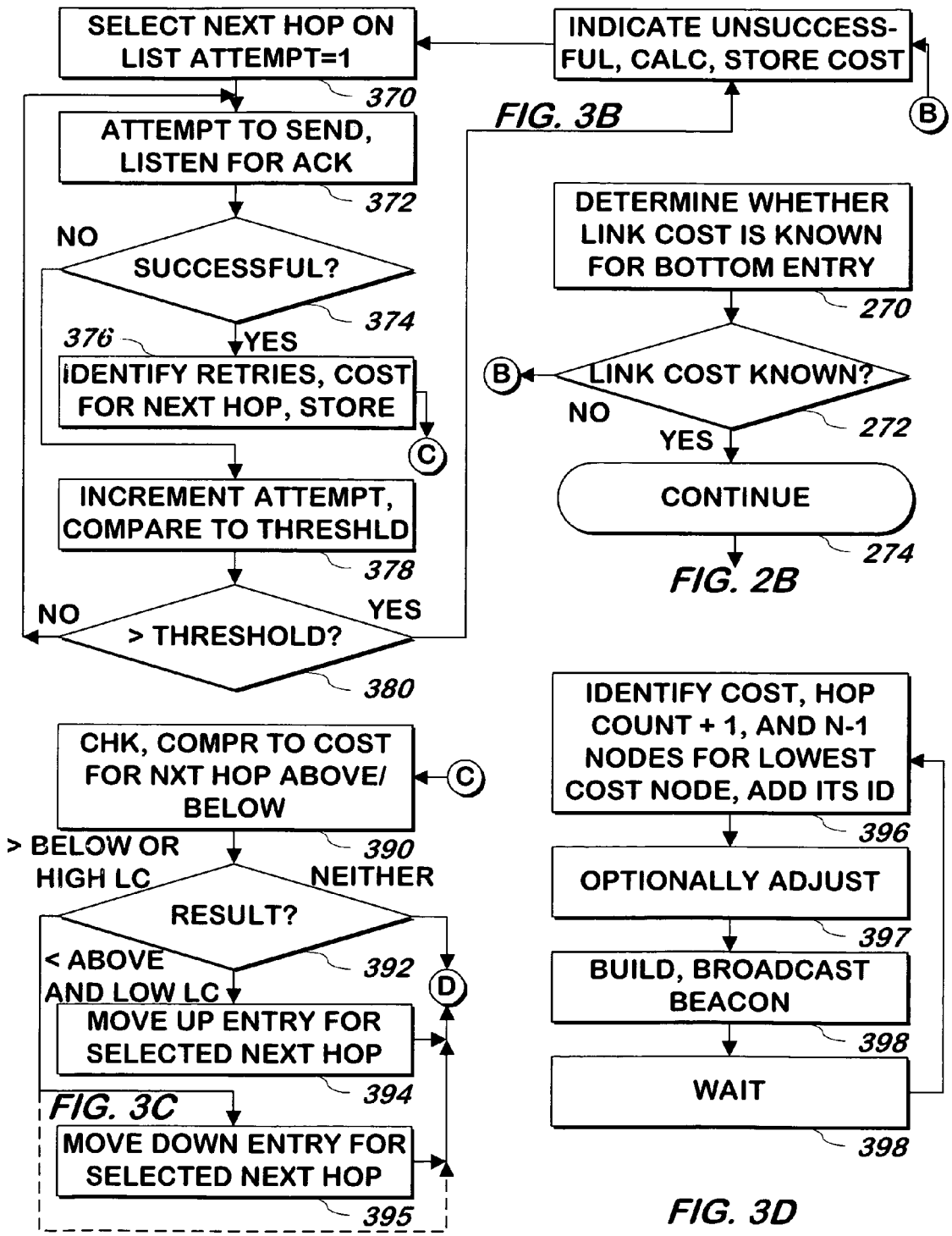

SYSTEM AND METHOD FOR MANAGING A LIST OF ENTRIES CONTAINING ROUTING INFORMATION

RELATED APPLICATIONS

This application claims the benefit of U.S. Provisional Patent Application Ser. No. 61/001,520, entitled "Method and Apparatus for Managing Entries on a List of Routing Information" filed Nov. 1, 2007, and is related to the subject matter of U.S. Provisional Patent Application Ser. No. 61/001,634 entitled, "Method and Apparatus for Providing Route Information" filed on Nov. 1, 2007, U.S. application Ser. No. 12/290,850 entitled "System and Method for Providing Route Information", filed Nov. 3, 2008, U.S. patent application Ser. No. 12/290,848 entitled, "System and Method for Accepting Information From Routing Messages Into A List" filed Nov. 3, 2008, and U.S. patent application Ser. No. 12/290,822 entitled, "System and Method for Computing Cost Metrics for Wireless Network Links" filed Nov. 3, 2008, each having the same assignee as this application and each is incorporated herein by reference in its entirety.

FIELD OF THE INVENTION

The present invention is related to computer software and more specifically to computer software for computer networking.

BACKGROUND OF THE INVENTION

Routing messages are messages that are sent from one node that routes messages in a network, to one or more other nodes that route messages in the network, to inform the one or more other nodes receiving the message of the routing costs of the sender. The receiving nodes then use the information contained in the routing messages they receive to identify the path or paths by which messages should be sent, and to build and send their own routing messages using the path or paths identified.

Paths may be identified by selecting a path with the lowest cost to the destination. Conventional costs may include hop counts, i.e. the number of nodes between a node attempting to send a message that is to be routed, and the destination specified or implied by the message. Because the speed at which a message may be sent can be dramatically impacted by the hop count of a wired network, selecting a path with the lowest hop count or other low costs can allow messages to be routed as rapidly, or nearly rapidly as possible. However, conventional hop counts may not accurately address all of the issues associated with sending a message in a wireless network.

When routing messages, routing loops may occur, whereby a first node routes to another node that routes through the first node. It is desirable to avoid routing messages through such routing loops.

What is needed is a system and method that can efficiently route messages while addressing the needs of a wireless network, yet be able to accommodate frequent changes and to avoid routing loops.

SUMMARY OF INVENTION

A system and method receives routing messages and determines if the received routing message will cause, or has an identified potential to cause, a routing loop. A routing loop occurs when a first node routes a message to a second node that routes back through the first node to the destination. The first N nodes through which a node will route and/or the hop count are included in each routing message to allow for detection of a routing loop. An identified potential to cause a routing loop may correspond to a message that includes the identifier of the receiving node in the list of the first N nodes, or has a higher hop count of routing to the destination than that corresponding to the node receiving the message. A message that does not have a routing loop, or have an identified potential to cause a routing loop, is considered for storage.

Such a message is stored if space is available. If space is unavailable, the system and method compares the advertised cost of the received routing message with a cost associated with an entry stored at the end of a candidate next hop list of semi-sorted routing information described in more detail below. If the cost of the received routing message is much higher than the entry, the received routing message is discarded. If the cost of the received routing message is much lower than the entry, the system and method replaces the entry with information from the received routing message. If the cost described in the received routing message is near the cost associated with the entry, the system and method compares one or more measures of signal quality, such as RSSI (a measure of signal strength), bit error rates, chip error rates, or all of these, of the received routing message with that of a message to which the information corresponding to the last entry in the candidate next hop list corresponds. If the received routing message has a much higher signal quality than that associated with the entry, the system and method replaces the entry with information from the received routing message and its signal quality, and otherwise, the system and method discards the received routing message. In one embodiment, if the link cost for the bottom entry in the candidate next hop list has not been evaluated as described below, the received beacon will not be used to replace it, or will not be used to replace it unless the advertised cost in the received beacon is much lower than the advertised cost of the bottom entry in the candidate next hop list.

As communications are received to be routed to a destination, the candidate next hop list is used to select a node through which to route each communication. The node corresponding to the top entry in the candidate next hop list (i.e. the head) is generally used to route communications to a gateway or other destination. If that node is unavailable, an entry is randomly selected from among those on the candidate next hop list having a hop count not greater or not significantly greater than the hop count of the node at the head of the candidate next hop list (with preference given to those not already selected once) and one or more attempts are made to send the communication to the node corresponding to the randomly selected entry. If an acknowledgement is received, the number of attempts it took to successfully send the message is identified as a link cost to that node, and that link cost may be combined with any other link cost previously identified for the node to compute the link cost for the node that is stored with the entry on the candidate next hop list.

The total cost, including the link cost to the node and the cost the node itself advertised in the last routing message the node sent, is then compared with the entries in the candidate next hop list above and below the selected entry. If the cost identified is lower than the total cost of the entry above it, and the link cost does not exceed a threshold maximum cost, the entry is moved up one position on the candidate next hop list. Otherwise, if the cost identified is higher than the total cost of the entry below it, the entry is optionally moved down one position on the candidate next hop list. If the link cost is higher than the threshold maximum, the entry is moved down the one position in the candidate next hop list. The system and method then resumes sending communications using the node corresponding to the entry at the head of the candidate next hop list, which may not necessarily be the entry with the lowest total cost.

When a communication is received for routing, if a fixed or variable number of communications have been routed since a previous time the top entry was not used (or since the previous time a different entry was selected for the same reason), one of the other entries on the candidate next hop list with a hop count not higher, or not significantly higher, than the hop count of the top of the candidate next hop list, and/or with a total cost not significantly exceeding the top entry on the candidate next hop list is selected, for example, at random from among such entries or among entries not recently used or previously used for this purpose, and the total cost of using the node corresponding to that entry is identified by sending the received communication through that node and identifying the cost of using the node by adding the advertised cost of the node to the cost of sending to that node, such cost being a function of the number of attempts required to successfully send messages to that node in the same manner as was described above. The total cost for the entry is again computed and the selected entry is moved up (and optionally, or down) on the candidate next hop list in the same manner as described above. However, unlike the case in which the node corresponding to the entry at the head of the candidate next hop list was unavailable as described above, in which case a node not corresponding to the head of the candidate next hop list is used a single time, the same node is selected and used repeatedly, and its position is optionally moved based on its cost as described herein, until its position on the candidate next hop list stabilizes. Sending of communications then resumes using the node corresponding to the entry at the head of the candidate next hop list until that node is unavailable or the number of messages is reached to make another random selection.

In this manner, the entries with total costs near, or lower than, the entry at the head of the candidate next hop list are repeatedly probed to ensure that the node with a consistently lowest cost will arrive at the head of the candidate next hop list, while occasionally probing other nodes on the candidate next hop list to ensure that total costs for other entries on the candidate next hop list are measured. As devices change their costs due to different locations, interference, etc., such costs are reflected in the order of the candidate next hop list. As noted, the total cost for an entry without a known link cost is considered to be a very high total cost: the measurement of the actual total cost for such nodes allows such nodes to be considered for the default next hop node position. However, the lowest cost node may not always be at the head of the candidate next hop list at any time, yet the node at the head of the candidate next hop list may be used for routing to a destination corresponding to the candidate next hop list.

Thus, the measured total cost of sending a communication to a node will impact the position of the entry for that node on the candidate next hop list, but when determining whether to insert an entry into the candidate next hop list, the measured total cost is not fully identified, advertised cost is used instead, with signal quality used to break ties and near ties, with preference given to existing members of the candidate next hop list for which the link cost has not been established. Thus, the order of the candidate next hop list can be maintained for some next hop nodes even before a single message that would provide an accurate indication of their total cost is sent to those nodes.

Costs to the next hop node may be computed using the ratio of successful transmissions to the number of attempted transmissions to the node, or may be computed using other methods. Because each node can use the same method of identifying the link cost to its neighbor nodes, the total cost may be a function of the efficiency of the communication path, both in terms of power that may be required to send a communication and the time it will take. In other embodiments only some of the nodes use this method of identifying link costs to their next hop nodes and in still other embodiments, none of the nodes use this method.

When a device advertises its cost of sending to the destination, it identifies the total cost at the head of the candidate next hop list as its cost of sending messages to the destination. The cost advertised may be adjusted using other issues, such as power issues, including whether the device has a large or small battery, or in accordance with latency and/or throughput issues.

In this manner, the signal quality, such as RSSI is used, along with the advertised total cost or another cost metric, to form an initial estimate of the total cost, which may be later measured by testing transmissions sent to the node from which the beacon is received and receiving an acknowledgement. Until the link cost is measured, the confidence in the total cost is low. After an amount of testing has taken place, entries near the bottom of the candidate next hop list will be those in which the confidence in their total cost is low, and entries near the top of the candidate next hop list are those in which the confidence is higher, due to being measured. Among the entries in which confidence is high, such entries will become sorted or nearly sorted based on their total cost.

BRIEF DESCRIPTION OF THE DRAWINGS

FIGS. 3A, 3B and 3C are a flowchart illustrating a method of managing a candidate next hop list of entries containing routing information and routing messages using the candidate next hop list according to one embodiment of the present invention.

FIG. 3D is a flowchart illustrating a method of sending a beacon according to one embodiment of the present invention.

DETAILED DESCRIPTION OF A PREFERRED EMBODIMENT

Figure 1:
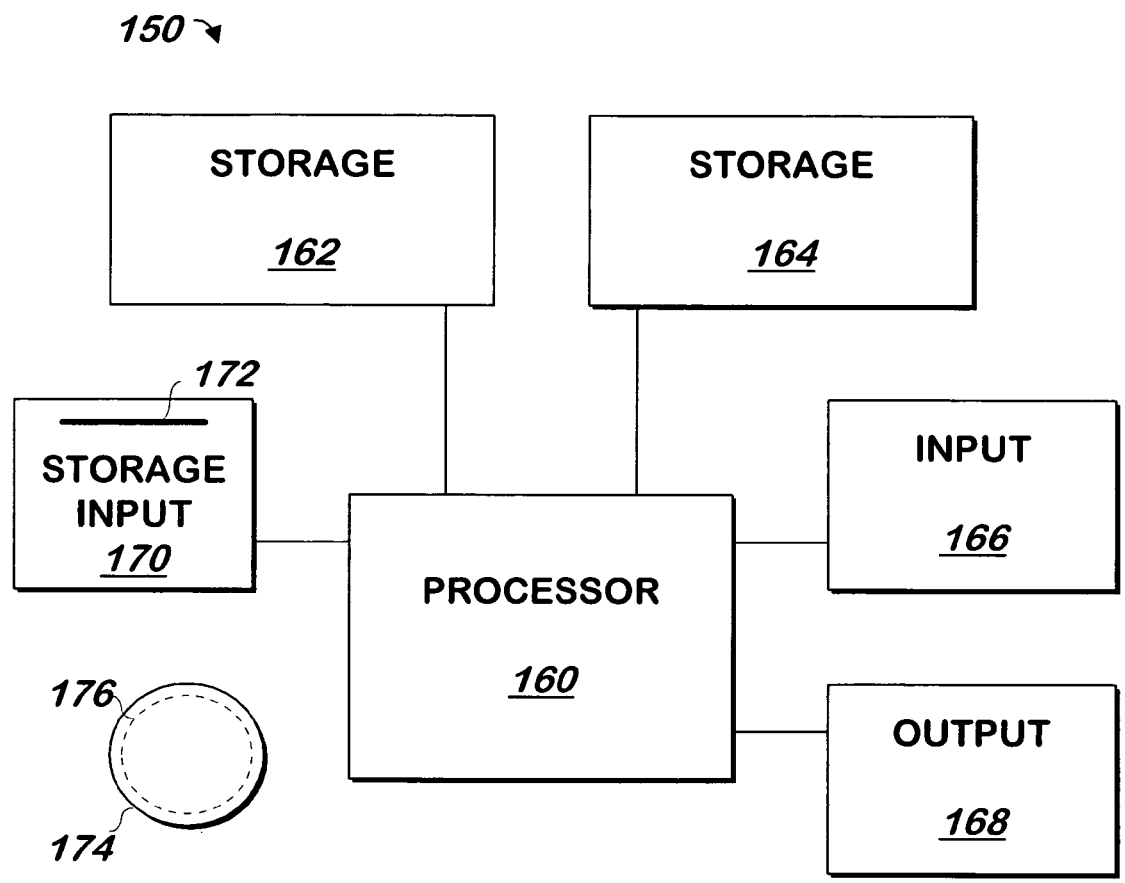
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Tex. running a version of the WINDOWS operating system (such as 95, 98, Me, XP, NT or 2000) commercially available from MICROSOFT Corporation of Redmond Wash. or a Macintosh computer system running the MACOS or OPENSTEP operating system commercially available from APPLE INCORPORATED of Cupertino, Calif. and the NETSCAPE browser commercially available from NETSCAPE COMMUNICATIONS CORPORATION of Mountain View, Calif. or INTERNET EXPLORER browser commercially available from MICROSOFT above, although other systems may be used. In one embodiment, systems may be based on the conventional MSP430 commercially available from Texas Instruments, Inc., of Dallas, Tex., or the atmega128 commercially available from Atmel Corporation, of San Jose, Calif., or the PXA xscale commercially available from Intel Corporation of Santa Clara, Calif. or other similar systems. Such systems may run the conventional TinyOS, commercially available from the web site of SourceForge.net or another operating system, such as a real time operating system.

Building the Candidate Next Hop List

Figure 2A:
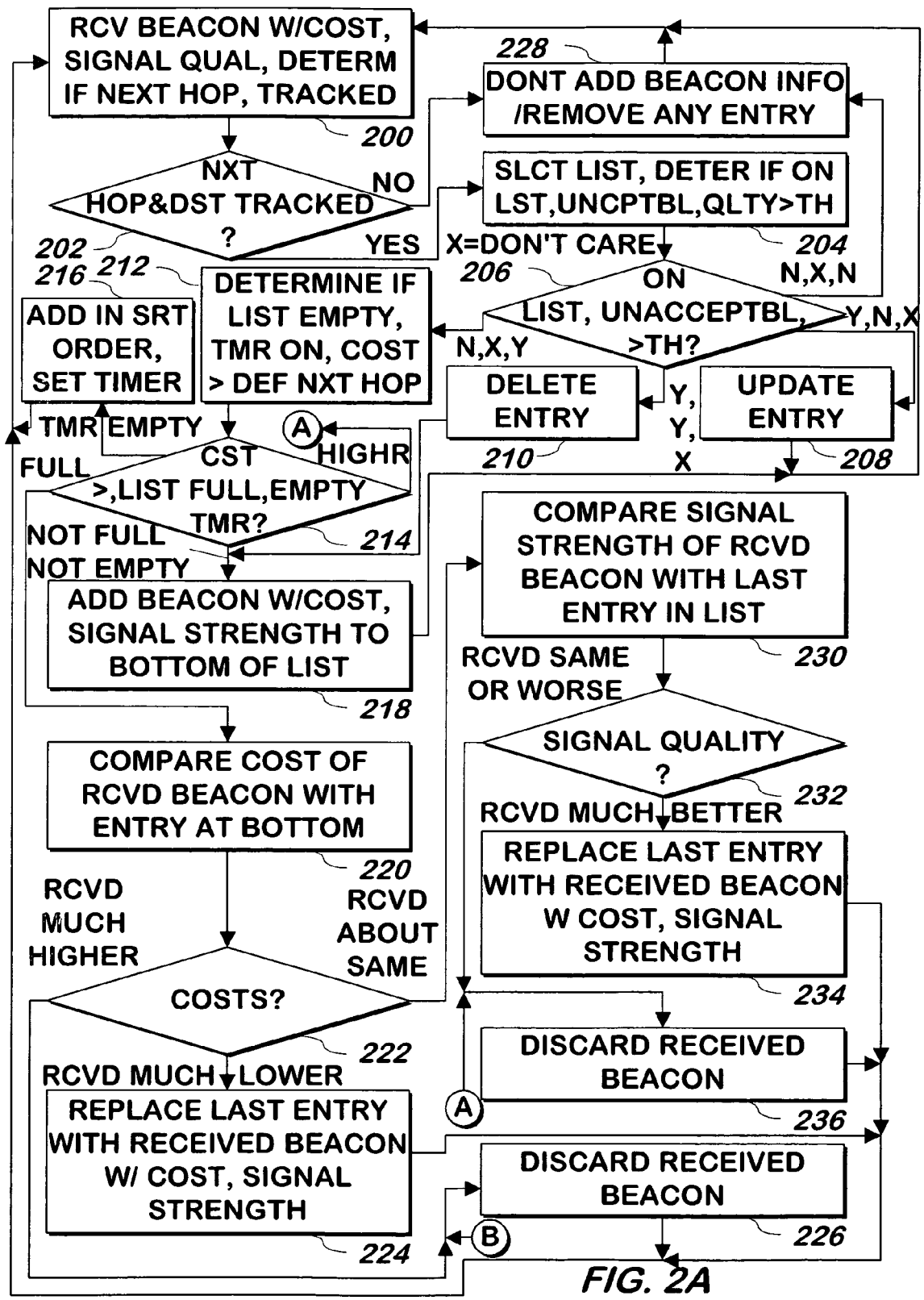
FIG. 2, consisting of FIGS. 2A and 2B, is a flowchart illustrating a method of accepting information from routing messages into a candidate next hop list according to one embodiment of the present invention.

Referring now to FIG. 2, consisting of FIGS. 2A and 2B, a method of adding routing information to a candidate next hop list is shown according to one embodiment of the present invention. A beacon with cost information is received along with the signal quality of the received beacon 200. In one embodiment, the cost information is received as part of the beacon, and the signal quality is provided and received by a radio that receives the beacon. Signal quality information may include a conventional RSSI reading, though other signal quality information may be used.

In one embodiment, each beacon contains an identifier of the node that originated the beacon, a hop count indicating how many other nodes will be traversed from that node when a communication is sent from the node that sent the beacon to a destination (which may be implied or may be specified in the beacon) and a list of identifiers of the first N nodes through which the originator of the beacon routes communications to a destination, where N is some or all of the nodes up to a maximum, such as four nodes. Other nodes may be used to route such communications, but would not be on the candidate next hop list. Other embodiments contain other numbers of nodes as the maximum, or no maximum.

As part of step 200, a determination is made as to whether the source of the beacon is a next hop node, or not a next hop node, of the recipient. In one embodiment, the beacon corresponds to a node that is a next hop of the recipient node if the list of such other nodes through which the originator of the beacon routes communications does not include an identifier of the receiving node. In another embodiment, the beacon corresponds to a node that is a next hop node if the hop count advertised in the received beacon is equal to or less than, or not significantly (e.g. 20%) greater than, the hop count (or hop count to the destination advertised in the received beacon) of the receiving node, as described below. In one embodiment, a beacon corresponds to a node that is a next hop node if both of these tests are met. Otherwise, the node is a not a next hop node. The originator of the beacon is the node that first sent the beacon. It is noted that the recipient node may, in fact, be on the route to the destination as node N+1 or greater. In that case, the recipient node will still identify the originating node as a next hop node, unless the hop count test is used or is also used.

As described herein, the destination for all communications is always the same and thus the beacons do not contain any indication of what the destination actually is, unless the destination is within the first N (e.g. four) hops. In another embodiment, there may be any of several destinations, but each of the destinations is interchangeable with one another. For example, there may be several gateways from the wireless devices performing the method to a wired network. However, each gateway is interchangeable with any other gateway, and thus a device that can reach one of the gateways in one hop would advertise the cost and number of that hop as described herein. In still another embodiment, each beacon specifies the destination to which it pertains. In this embodiment, a beacon includes an identifier of a destination. Step 200 also includes determining whether the destination is tracked. This may involve comparing the identifier of the destination in the beacon to a supplied list of destinations that should be tracked.

If the originating node is not a next hop node to the receiving node or the destination is not tracked 202, information from the beacon is not added to the candidate next hop list 228, and the method continues at step 200. As part of step 228, the node identified as not being a next hop node is checked to see if an entry for that node is already on the candidate next hop list corresponding to the destination, and if so, the entry corresponding to that entry is removed from the candidate next hop list.

If the beacon corresponds to a node that is a next hop node and optionally, the destination is tracked 202, the candidate next hop list of entries corresponding to that destination is selected, and a determination is made as to whether the signal quality exceeds a threshold, and whether the next hop node is already on the candidate next hop list and if so, whether the cost information for that next hop node has changed 204. In one embodiment, any change is identified as a change and in another embodiment, a change is only identified if the cost is outside a threshold of the cost stored in the corresponding entry on the candidate next hop list, such as 2%, or the signal quality received is lower, or significantly lower (e.g. 10%) than the signal quality stored with the corresponding entry on the candidate next hop list, or both.

The selected candidate next hop list will be used for all subsequent dealings with regard to the received beacon as described herein, and so the candidate next hop list referred to herein is the candidate next hop list that is selected.

If the next hop node is not on the candidate next hop list, if, in one embodiment, the signal quality does not exceed the threshold 206 or, in one embodiment, the total cost (if known) exceeds the advertised cost of the default next hop node the method continues at step 228. In one embodiment, the threshold may be set lower if there are no entries on the candidate next hop list than it would if there were, and it may be set as a function of the number of entries on the candidate next hop list. If the next hop node is not on the candidate next hop list and the signal quality does exceed the threshold 206, the method continues at step 212.

If the next hop node is on the candidate next hop list and the routing cost in the beacon is not identified as unacceptably different (e.g. more than ten percent, or, in one embodiment, the advertised cost is higher than the total cost of the default next hop node on the candidate next hop list), from the routing cost stored in the corresponding entry on the candidate next hop list for the node that originated the beacon 206, or the signal quality is not unacceptably lower than the signal quality in the corresponding entry, or the weighted average signal quality is not below the threshold or otherwise unacceptably low, other information from the beacon may be used to update 208 the entry on the candidate next hop list corresponding to the device that originated the beacon, for example, by updating the signal quality to a higher signal quality or the list of nodes through which such device initially routes messages.

The signal quality may be used to identify a weighted average signal quality for the node that sent the beacon, for example, by multiplying the received signal quality by 0.8, multiplying the stored signal quality for that node by 0.2, summing them and updating the signal quality for the entry corresponding to the received beacon using the result. Other weighting methods may be used, for example weighting the signal quality according to the number of recent readings. The method continues at step 200. In one embodiment, if the advertised cost increases, but not unacceptably so (e.g. it isn't above the highest advertised cost on the candidate next hop list or isn't higher by a certain amount or percentage, such as five or ten percent), the total cost for the updated entry on the candidate next hop list of next hop nodes is compared to the total cost of the entries above and below that entry on the candidate next hop list, and if the total cost is lower than the total cost of the entry above, the order of those entries is swapped. If not, but the total cost of the entry updated is higher than the cost of the entry below it, the order of those two entries are swapped. In other embodiments, the swapping is not performed at this point. Total costs and swapping are described in more detail below.

If the next hop node is on the candidate next hop list and the routing cost in the message is unacceptably different (e.g. it is significantly higher), from the routing cost stored in the entry on the candidate next hop list for the device that originated the message 206, or the received signal quality is unacceptably lower than the signal quality stored in the entry corresponding to the received message, or the weighted average signal quality would be below the threshold, the entry on the candidate next hop list is deleted 210 and the method continues at step 218, where information from the newly received message may be added as an entry.

At step 212, the candidate next hop list is investigated to determine if the candidate next hop list is empty, and if not, whether a timer is active, whether the candidate next hop list is full, and in one embodiment, if neither one of these are true, whether the advertised cost in the beacon is higher than the total cost of the entry at the head of the candidate next hop list.

If the timer is active or the candidate next hop list is empty 214, information from the beacon is added to the candidate next hop list if space is available on the candidate next hop list using a binary sort type algorithm for placement, with the candidate next hop list kept in sorted order of advertised cost, with ties and near-ties being broken in favor of signal quality (also referred to as link quality) 216.

Information from the beacon that is added to the entry includes the identifier of the node that originated the beacon, the hop count the list of N nodes through which it routes (or all but the last of these nodes), the advertised cost (each of the foregoing received in the beacon), and the measure of signal quality. A binary sort type algorithm puts the first entry at or near the center of the candidate next hop list and other entries are added above or below that entry according to the advertised cost of the beacon, with the placement a function of how much higher or lower the advertised cost is from the nearest cost beacon. Beacons that have similar, though not identical costs (e.g. within two, five or ten percent, or within a threshold amount of costs) are considered tied, with ties being broken in favor of the entry having the best signal quality. If the candidate next hop list was empty, the timer is set as part of step 216. The timer is of relatively limited duration, being as small as ten seconds in one embodiment, or a minute or two in another embodiment. During this amount of time from when the timer is set until it expires, the timer is considered to be active.

In one embodiment, if the candidate next hop list is not empty and the timer is not active 214, if the advertised cost in the beacon is higher than the total cost of the entry at the head of the candidate next hop list 214, the beacon is discarded 236. In another embodiment, no comparison is performed between the advertised cost and the total cost of the entry at the top of the candidate next hop list and processing continues as is now described.

If the candidate next hop list is not empty and the timer is not active, if the candidate next hop list is not full 214, information from the beacon, including an identifier of the beacon (such as an IP address or MAC address), the hop count from the beacon, the cost of routing through the originator of the beacon (all of which are part of the beacon), the list of the first N nodes through which that node routes messages, and the signal quality with which the beacon was received, is added to the bottom of the candidate next hop list 218, and the method continues at step 200. The signal quality may include the conventional RSSI measure of signal quality, and may be received from a radio that receives the beacon at the receiving node.

If the candidate next hop list is full 214, the routing cost of the node that sent the beacon is compared with the routing cost stored at the entry at the bottom of the candidate next hop list 220. If the routing cost advertised in the received beacon is much higher than the routing cost of the entry at the bottom of the candidate next hop list 222, the received beacon is discarded 226, and the method continues at step 200. If the routing cost of the originating node of the received beacon is much lower than the routing cost of the entry at the bottom of the candidate next hop list, the last entry the in the candidate next hop list is replaced with information from the received beacon, including the identifier of the node from which the beacon was received, the cost provided in that beacon, and the signal quality with which the beacon was received 224, and the method continues at step 200. Much higher or much lower (or significantly higher or significantly lower) may be 2%, 5%, 10% 15% or 20% in different embodiments.

If the cost in the beacon is about the same as the cost in the last entry 222, for example if the two costs are within 15 to 20 percent of one another, the signal quality of the received beacon is compared to the signal quality stored in the entry at the bottom of the candidate next hop list 230. The signal quality stored in the entry at the bottom of the candidate next hop list corresponds to the signal quality with which one or more previously received beacons from the device that originated the beacon was received (which may have been weighted averaged as described above). If the signal quality of the newly received beacon is about the same or lower than the signal quality stored in the entry at the bottom of the candidate next hop list 232, the received beacon is discarded 236 and the method continues at step 200. If the signal quality of the received beacon is much better (e.g. two or three or five or ten or fifteen or twenty percent) than the signal quality stored in the entry at the bottom of the candidate next hop list 232, the last entry in the candidate next hop list is replaced with information from the received beacon 234, including the identifier of the node that sent the beacon, the hop count and cost provided in that beacon, and the signal quality with which the beacon was received and the first N nodes 234, and the method continues at step 200.

In another embodiment, the above criteria of steps 230-232 in one embodiment, or 220-232 in another embodiment, are only evaluated if a link cost has been established for the bottom entry in the candidate next hop list by testing it as described herein, and otherwise, the newly received beacon will be discarded. Prior to step 230 in one embodiment, or step 220 in another embodiment, a determination is made as to whether the link cost is known for the bottom entry in the candidate next hop list 270. If not 272, the method continues at step 226, and otherwise 272, the method continues at step 220 or 230 as described herein.

Thus, any of several approaches may be used. In one embodiment, entries with a known link cost may be preferred to entries without a known link cost, even if the signal quality is in fact a bit lower for the entry with the known link cost. In one embodiment, entries are considered to have a known link cost if the number of communications that have been sent to the node exceeds a threshold, such number being maintained in the entry. If no link cost has been established, the preference may be for the more recent message, and thus, if the signal quality of the newly received message is about the same or higher, the entry at the bottom of the candidate next hop list is replaced with an entry corresponding to the message, and otherwise, the message is discarded. In one embodiment, the entry at the bottom of the candidate next hop list is preferred to a new message. In still another embodiment, this preference expires a threshold amount of time after the entry at the bottom of the candidate next hop list is entered.

At the time the first entry is added, and shortly thereafter, entries are added differently than they are later. Thus, when the timer is active, entries are added to the candidate next hop list in nearly sorted order of the advertised cost, with ties and near ties broken in favor of signal quality. Once the timer has expired, entries are added to the bottom of the candidate next hop list as described herein and may bubble their way up. It is noted that the list of N nodes (though which a device routes) is described as such, and entries on that list need not change their positions when positions of entries on the candidate next hop list are changed as described herein, though they list of N nodes that is sent as part of a beacon can change to reflect changes to the entry at the head of the candidate next hop list.

Using and Managing the Candidate Next Hop List

Figure 3A:
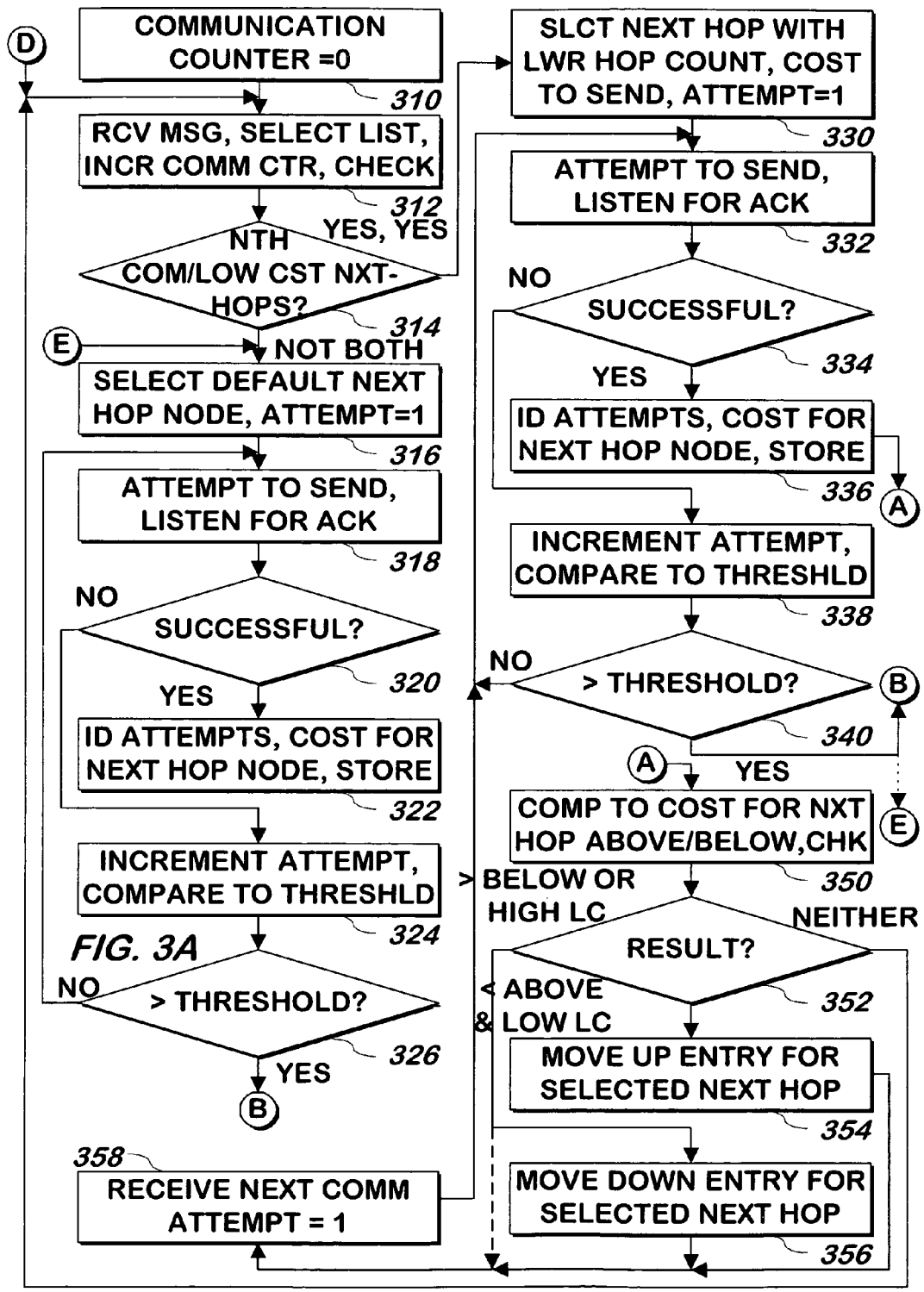

Referring now to FIGS. 3A, 3B and 3C, a method of managing a candidate next hop list of routing information, and a method of routing communications using the candidate next hop list, is shown according to one embodiment of the present invention. A communication counter is set to zero 310. In one embodiment, the communication counter is stored associated with each candidate next hop list, and counts the communications that are received and sent using the candidate next hop list as described herein. A communication is received, a candidate next hop list is selected corresponding to the destination received as part of the received communication, and the communication counter for the selected candidate next hop list is incremented 312. The selected candidate next hop list is the candidate next hop list referred to in the remainder of the discussion with respect to the Figure. A check is performed to determine whether the communication counter for the selected candidate next hop list indicates that the communication is one of every Nth communications (e.g. the communication counter modulo N is zero), and whether there are next hop nodes on the candidate next hop list to which communications have not been sent before.

In one embodiment, every Nth message is treated differently as described herein, and if the communication is an Nth communication, such as every 20 communications 314, the method continues at step 330 and otherwise 314, the method continues at step 316. In one embodiment, such N may be selected in a manner (e.g. pseudo-randomly) that can allow the value of N to change from time to time or after the prior value of N communications have been received. In one embodiment, if the candidate next hop list does not contain at least one entry that has a total cost nearly as low (e.g. up to ten percent higher) or lower than the total cost for the default next hop node 314, the method will also continue at step 316, even if the communication is the Nth communication. It is noted that N for the Nth communication may be different than the N number of nodes through which a node routes.

At step 316, the entry in the candidate next hop list corresponding to the default next hop node is selected, and an attempt counter for the candidate next hop list is set to one. In one embodiment, the default next hop node is the next hop node on top (i.e. the head) of the candidate next hop list of routing information described herein. In one embodiment, the default next hop node is the next hop node at the top of the candidate next hop list, which may or may not have the lowest cost of routing a message to a gateway or other destination, than the other entries on the candidate next hop list.

Each entry on the candidate next hop list describes a next hop node, which is a device that can be the next hop in a route to the gateway or other destination. In one embodiment, each entry in the candidate next hop list contains an identifier, such as an IP address or other type of unique address, of the next hop node corresponding to that entry, the hop count and cost advertised by the next hop node of sending a communication from that next hop node to the gateway or other destination, identifiers of the first N hops from that node, and may include the link cost, if known, of sending a communication to that next hop node from the device performing the method or implementing some or all of the system, of the present invention. Each entry on the candidate next hop list may also contain a measure of signal quality corresponding to one or more messages received from the device corresponding to the entry as described herein.

An attempt is made to send the communication to the gateway or other destination through the default next hop node and to listen for an acknowledgment indicating the attempt was successful 318. If the attempt was successful because the acknowledgment has been received from the default next hop node 320, the number of attempts that was required to successfully send a communication is identified using the attempt counter and stored associated with the entry for the default next hop node on the candidate next hop list, and a cost for sending using the default next hop node is identified and stored 322. In one embodiment, the number of attempts for each of the last five communications (or another number of communications) is stored associated with the entry for the next hop node to which such communications were sent, with the number of attempts being stored in the order in which communications were sent. Identifying the cost for the next hop node may include averaging the number of attempts it took to successfully send each communication, or computing a weighted average of such number of attempts per communication by weighting the most recent attempts more heavily than the older attempts, in which case, each attempt and acknowledgement may be time stamped and the weight may be proportional to the age of the attempt. The weighted average may instead be computed by multiplying the link cost stored with the entry for the default next hop node by 0.2, multiplying the newly identified cost by 0.8 and storing the sum of the result in the entry as the link cost for the default next hop node. In one embodiment, the link cost is a function of only the most recent attempt, the cost being equal to the number of attempts at it took to successfully send the most recent communication.

The total cost of sending a communication through a next hop node is the sum of the link cost of sending to that next hop node, and the cost advertised by the next hop node in the beacon, and such cost of sending to the next hop node is stored associated with the beacon information for that next hop node. Because each node can use the same manner of identifying its link cost, in one embodiment the total cost may be a function of the ratio of attempts to communications for each of the links in the path to the destination. If the attempt made in step 318 is not successful 320, for example because an acknowledgment is not received within a threshold amount of time, the number of attempts or attempts for the communication is incremented (and optionally, time stamped) and that number is compared to a threshold 324. If the number does not exceed the threshold 326, the method continues at step 318. If the number exceeds the threshold 326, the method continues at step 368 of FIG. 3B.

Nth Communication Processing.

As noted above, step 330 is performed if the communication is the Nth communication and optionally, if an entry on the candidate next hop list exists with a total cost not significantly higher than the total cost for the default next hop node. As noted, N may be fixed or may be variable, for example, selected randomly within a range of possible values, for example 10 to 40. At step 330, one of the entries on the candidate next hop list corresponding to a next hop node that has either a hop count that is not greater than the hop count of the default next hop node at the top of the candidate next hop list, or a total cost not significantly higher than the total cost of the default next hop node, or both is selected (e.g. at random, or the one not previously selected for this purpose or not selected for this purpose for the longest amount of time) and an attempt counter is set equal to one. In one embodiment, a preference is given to nodes that have not been selected or not been selected for this purpose.

In one embodiment, step 330 includes selecting the next value of N to be used in the next iteration, though in one embodiment, N is fixed and need not be selected at each iteration. In one embodiment, the value of N is selected from a range of possible values using a conventional probability distribution. This value of N will be used at each iteration of step 312 and 314 until it is changed at step 330. In such embodiment, step 330 includes resetting the communication counter to zero.

An attempt is made to send the communication using the next hop node corresponding to the selected entry, and an acknowledgment is listened for 332. If the attempt is successful, because the acknowledgment is received from the next hop node corresponding to the selected entry 334, the number of attempts is identified using the attempt counter, and used to compute a link cost for the selected entry, and the link cost is stored associated with that selected entry 336. In one embodiment, the link cost for the selected entry is identified in the same manner as for the entry for the default next hop node, as described herein and above. The method continues at step 350. If the attempt is unsuccessful 334, the attempt counter is incremented and compared to a threshold 338. If the attempt counter has exceeded the threshold 340, the method continues at step 368 of FIG. 3B in one embodiment, or at step 316 in another embodiment. If the number of attempts has not exceeded the threshold 340, the method continues at step 332.

Upon successful completion of a message sent to a node that is not at the head of the candidate next hop list, step 350 is performed. At step 350, a total cost of the next hop node corresponding to the selected entry is compared to the total cost of the next hop nodes above and below the selected next hop node on the candidate next hop list. In one embodiment, the total cost is equal to the cost advertised by the next hop node that is incurred in reaching the gateway starting with that next hop node, plus the link cost of reaching the next hop node, computed as described above (referred to as the "total cost"). In one embodiment, entries on the candidate next hop list corresponding to next hop nodes for which the link cost of reaching such next hop nodes is not known are considered to have an infinite, or a very high, total cost.

If the result of the comparison is that the total cost of the next hop node corresponding to the selected entry is higher than the total cost of the next hop node corresponding to the entry immediately below the selected entry on the candidate next hop list 352, the entry for the selected next hop node is moved down one position on the candidate next hop list 356 and the method continues at step 358. At step 358, when the next communication is received, the attempt counter is set to one, and the method continues at step 332 using the same selected entry. Thus, the selected entry will "bubble" its way down the candidate next hop list in the same manner as a bubble sort, one position at a time. Other algorithms similar to other sorting algorithms may be used. In one embodiment, moving down is not explicitly performed, as entries will move down only when other entries move up, so step 358 is used instead of step 356 as shown by the dashed line in the Figure.

If the result of the comparison is that the newly computed total cost of the next hop node corresponding to the selected entry is less than that of the next hop node corresponding to the entry above the selected entry on the candidate next hop list 352, the entry for the selected next hop node is moved up one position on the candidate next hop list 354, and the method continues at step 358.

In one embodiment, moving an entry up involves swapping the order of that entry with the entry above it, and moving an entry down involves swapping the order of the selected entry with the entry below that entry. In one embodiment, the candidate next hop list has a logical order, and so moving the entries up or down includes changing the logical order of the entries as described above, using conventional techniques.

If the total cost for the selected entry is neither higher than the entry below, or lower than the entry above 352, the method continues at step 312 where the default next hop node will again be used. In one embodiment, a swap is only performed if the costs are significantly different, meaning different by more than an amount or a percentage of the total cost of the entry being considered for moving.

In one embodiment, if the newly computed link cost for the selected entry exceeds a threshold, the entry will never be moved up, and in fact will be moved down as part of steps 350-354, even in the embodiment in which moving nodes down is not explicitly performed as a result of comparison of the total cost for the selected entry and the entry below. In such embodiment, step 352 also adds the criteria that the link cost for the selected entry exceeds the threshold, with step 354 being performed if the link cost exceeds the threshold. Thus, step 350 includes checking to see that the link cost is less than the threshold.

Next Hop Node Unable to Send.

When a message is unable to be successfully sent by a selected next hop node after a threshold number of attempts, step 368 is performed. At step 368 of FIG. 38, an indication that the communication was not successfully sent may be stored associated with the entry corresponding to the next hop node used to attempt to send the communication in the candidate next hop list, and the cost of sending to that next hop node may be recomputed as described above. For example, if the number of attempts is stored for each of the last five communications sent to that next hop node, a relatively large number (e.g. relative to the actual number of attempts that were sent), such as eight, may be used as the number of attempts for a communication that was not successfully sent, to indicate that the threshold had been exceeded on that attempt, or the number of attempts used may be the actual number of attempts. This number of attempts will increase the link cost of sending to the next hop node to which the communication was not able to be sent, as described above. Such action may be implemented when any other nodes are used in an attempt to send a communication, but the nodes do not acknowledge receipt as described herein.

Any entry on the candidate next hop list is randomly selected 370, and an attempt counter is set equal to one: In one embodiment, the selection gives preference to those entries on the candidate next hop list not already selected for this purpose or for any purpose. In one embodiment, selection is only made from among entries that have a hop count that is not greater or not significantly greater (e.g. by more than 20%) than the hop count of the default next hop node of the selected list.

An attempt is made to send the communication using the next hop node corresponding to the selected entry and an acknowledgment is listened for 372. If the attempt is successful, because the acknowledgment is received from the next hop node corresponding to the selected entry 374, the number of attempts is identified using the value of the attempt counter and used to compute a cost for the selected entry, and the cost is stored associated with that selected entry 376. In one embodiment, the cost for the selected entry is identified in the same manner as for the entry for the default next hop node, as described above. The method continues at step 390 of FIG. 3C. If the attempt is unsuccessful 374, the attempt counter is incremented and compared to a threshold 378. If the attempt counter has exceeded the threshold 380, the link cost of the selected entry may be adjusted as described above for an unsuccessful attempt, steps 390 through 395, described below, are optionally performed, and the method continues at step 370. If the number of attempts has not exceeded the threshold of 380, the method continues at step 372.

At step 390 of FIG. 3C, the total cost of the next hop node corresponding to the selected entry is computed, stored associated with the selected entry, and compared to the costs of the next hop nodes above and below the selected next hop node on the candidate next hop list.

If the result of the comparison is that the total cost of the next hop node corresponding to the selected entry is significantly higher (e.g. over ten percent) than the cost of the next hop node corresponding to the entry immediately below the selected entry on the candidate next hop list 392, the entry for the selected next hop node is moved down one position on the candidate next hop list 395, and the method continues at step 312. In one embodiment, moving down is not performed and step 395 is skipped, with step 312 being taken instead as shown by the dashed line in the Figure. In one embodiment, step 395 is performed if the link cost is below the threshold.

If the result of the comparison is that the newly computed total cost of the next hop node corresponding to the selected entry is significantly (e.g. over ten percent) less than that of the next hop node corresponding to the entry above the selected entry on the candidate next hop list 392, the entry for the selected next hop node is moved up one position on the candidate next hop list 394, and the method continues at step 312. If neither of the above is true 392, the method continues at step 312 of FIG. 3A. As described above, if the link cost for the selected entry is above a threshold, the link is never moved up and always moved down as part of steps 390-394. Thus, step 390 includes checking to see whether the link cost exceeds the threshold.

Thus, in contrast to the Nth communication causing an entry to be selected and used to send one or more communications until the position of the entry on the candidate next hop list stabilizes, if the default next hop node is unsuccessful at sending a communication, the different selected entry is used only for that one communication, after which the default next hop node is used again or, in the case of yet another failure, another selection of a different next hop node is made. The next hop node used to successfully send the communication may be moved up or down once, or not at all, but it will not bubble up or down further until a stabilization of its position is detected, as is the case when the Nth communication is identified and a next hop node other than the default next hop node is identified and used to send a communication as described above. Of course, the selected entry following the initial failure of the default next hop node may be the second entry, and it may move up into position as the default next hop node, causing it to be reused after the communication that the previous default next hop node could not send, or that entry may be reselected upon the failure of the default next hop node to successfully send the next communication, which could cause the selected entry to move two or more positions.

It is noted that the receiving nodes need do nothing with respect to the sending nodes other than acknowledge when a message is received. The receiving nodes need not maintain information regarding which nodes may reach the receiving node or the cost of doing so, and in one embodiment, no such information is maintained by a receiving node. The number of nodes that can send through a receiving node does not increase storage requirements for storing such reachability information on the receiving node, and thus the system and method scales easily when many nodes route through a particular receiving node.

It is noted that, in one embodiment, an entry for a node will bubble its way up to become the default next hop node if the node has both a sufficiently high signal quality (which will translate to a low ratio of attempts to successful completions) and a low advertised cost relative to other nodes through which the node maintaining the candidate next hop list may route communications. If only one of these criteria is met, but the other criteria is far out of the range of other nodes through which the node maintaining the candidate next hop list can route, the node is unlikely to become the default next hop node.

It is noted that, in one embodiment, there is a cooperation between the link layer, where the communication success rate is determined, and the network layer, which selects the entry on the candidate next hop list to use. The network layer periodically allows data to be gathered regarding the link layer (e.g. the communication success rate for a node), even for non default next hop nodes, yet the communication success rate may be used to determine the default next hop node. Additionally, a failure at the link layer can cause the network layer to obtain additional link layer information.

Sending Beacons.

Each of several nodes may perform the method described above. Additionally, each node may periodically or occasionally send its own beacon, including the total cost of sending a communication through its default next hop node, its hop count, a list of identifiers of nodes through which the node originating the beacon will route communications that contains the identifier of its own default next hop node and all but the last node identifiers provided by the default next hop node as its list of identifiers of nodes through which it routes communications, and the identifier of the node originating the communication.

Referring now to FIG. 3D, a method of sending a beacon is shown according to one embodiment of the present invention. The total cost, hop count incremented by one, and all but the last one of the N nodes identified by the default next hop node in its beacon are identified from the candidate next hop list 396 and the identifier of the default next hop node is added to the top of the list of N−1 nodes to complete the list of first N nodes through which the node sending the beacon will route communications. If different destinations are used, each candidate next hop list may have its own destination, and an identifier of the destination is also identified.

In one embodiment, the cost advertised in the beacon may include an adjustment to the total cost of routing through the lowest cost node by multiplying the link cost by a factor and adding the result to the total cost or by adding an amount to the total cost, the factor or amount being a function of a physical characteristic of the node originating the beacon. For example, if one node has one size battery, the factor or amount may be higher than if the node had a larger sized battery, or was line powered. Or a node with a low battery could use a higher factor or amount than the same node with a more full battery. A node that is solar powered with a battery backup may use a higher factor or amount at night or as nighttime approaches than one that is line powered. The factor allows, for example, nodes with a characteristic, such as a larger battery, a fuller battery or line power, to be used more frequently to route communications than those with a smaller battery, less full battery or those without line power or those otherwise expecting or experiencing a shortage of power. The hop count may also be adjusted by a factor corresponding to a physical characteristic of the device sending the beacon, such as the source of power described above.

Such an optional adjustment to the total cost of routing through the next hop node is identified 397. The beacon is built containing the total cost of the default next hop node or the adjusted total cost of the default next hop node, the hop count or adjusted hop count, the list of N nodes through which the originator of the beacon will route communications, and the identifier of the originating node, and optionally the destination, and the beacon is broadcast, wirelessly 398. In one embodiment, no destination or indication of a destination is broadcast with the beacon, though in other embodiments, different beacons may be broadcast for different destinations, either one after the other or on different schedules. Broadcast beacons are used to route messages by other nodes in the same manner as described herein.

After a period of delay 399, the method continues at step 396. Step 399 may include selecting a different candidate next hop list, so that beacons corresponding to each candidate next hop list are sent in a round robin fashion. In one embodiment, a single beacon is sent containing the information described above for each of every candidate next hop list maintained by a device.

System.

Receive Beacon.

Figure 4:
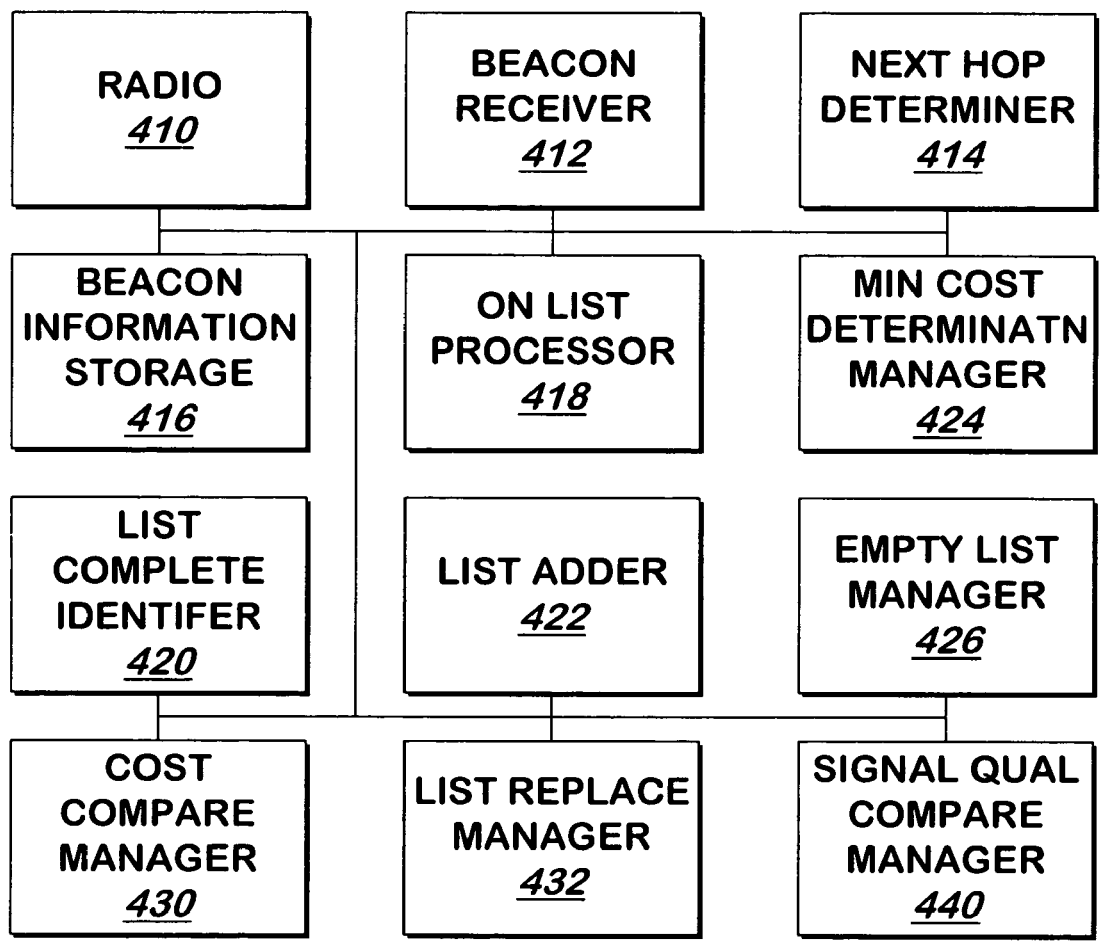
FIG. 4 is a block schematic diagram of a system for accepting information onto a candidate next hop list of routing information according to one embodiment of the present invention.

FIG. 4 is a block schematic diagram of a system for accepting information onto a candidate next hop list of routing information according to one embodiment of the present invention. Referring now to FIG. 4, at any time, beacon receiver 412 may receive a beacon via radio 410. In one embodiment, radio 410 is a conventional IEEE 802.15.x-compatible radio that provides some or all of the capabilities described by one or more 802.15.x specifications. Radio 410 transmits and receives data over a wireless network, though wired networks may also be used. Other radios and/or protocols may be used, such as the conventional 802.11a/b/g/h or other similar protocols. In one embodiment, beacon receiver 412 also receives from radio 410 the signal quality with which the beacon was received, for example as a conventional RSSI reading.

When beacon receiver 412 receives the beacon and the signal quality, beacon receiver 412 parses the beacon and adds the information in the beacon and a measure of the signal quality to a new beacon record that beacon receiver 412 stores in beacon information storage 416. In one embodiment, beacon information storage 416 includes conventional memory or disk storage, and may also include a conventional database. In one embodiment, the information in the beacon includes the identifier of the originator of the beacon, a list of identifiers of the N nearest nodes through which the node that generated the beacon routes messages, where N is some or all of the nodes up to a maximum, such as four nodes. The beacon information also includes the hop count and the cost of routing a message through the node that generated the beacon, as described herein. The beacon may include an identifier of a destination. Beacon receiver 412 provides a pointer to the newly created beacon record to next hop determiner 414.

Determine Whether Origin is Next Hop Node and Destination Should be Tracked.

When next hop determiner 414 receives the pointer, next hop determiner 414 locates the beacon record in beacon information storage 416, and uses in the beacon information in the beacon record to determine if the source of the beacon is a next hop node to the node in which beacon receiver 412 resides and, optionally, whether the destination is one that the device containing next hop determiner 414 is intended to track. In one embodiment, the originator of the beacon is a next hop node if A) the list of nodes through which the node that generated the beacon routes messages does not include the identifier of the node in which next hop determiner 414 resides B) the hope count in the beacon is not higher than the hop count of the node receiving the beacon, or both of these. In one embodiment, the identifier of the node in which next hop determiner 414 resides and the list of destinations the device should track are received from a system administrator and stored in beacon information storage 416, and next hop determiner 414 locates this identifier and the list of destinations and compares it to the identifiers included in the beacon information in order to determine if the source of the beacon is a next hop node and the destination is one that should be tracked.

If next hop determiner 414 determines that the source of the beacon is not a next hop node or the destination should not be tracked, in one embodiment next hop determiner 414 deletes the beacon record from beacon information storage 416. Otherwise, next hop determiner 414 provides the pointer to the beacon record to on list processor 418.

In one embodiment, if the source of the beacon is not a next hop node, next hop determiner 414 determines if the beacon corresponds to an entry on the candidate next hop list for the destination stored in beacon information storage 416 and if so, removes such entry from the candidate next hop list as described above.

Determine if on Candidate Next Hop List of Candidate Nodes, Process.

When it receives the pointer, on list processor 418 determines if an entry for the beacon is on the candidate next hop list corresponding to the destination and originator of the beacon in the beacon record, determines if any changes are unacceptable and determines if the signal quality is or has dropped below the threshold as described above. On list processor 418 then deletes or updates the entry or discards the beacon as described above with respect to steps 204-210 and 228 in FIG. 2 above, or if no such entry is on the candidate next hop list for the destination and the signal quality is greater than the threshold for the candidate next hop list at that time as described above, provides the pointer to minimum cost determination manager 424 in one embodiment, or to empty list manager 426 in another embodiment.

Check for Advertised Cost Less than Total Cost of Default Next Hop Node.

When it receives the pointer, minimum cost determination manger 424 determines if the advertised cost is greater than the total cost of the default next hop node. If so, minimum cost determination manager 424 discards the beacon record corresponding to the pointer, and otherwise, provides it to empty list manager 426.

Check for Empty Candidate Next Hop List or Timer from Empty Candidate Next Hop List.

When it receives the pointer, empty list manager 426 checks the candidate next hop list corresponding to the destination of the beacon record and if the candidate next hop list is nonexistent, creates it in beacon information storage 416 and adds the identifier of the destination from the beacon record to the candidate next hop list. Additionally, or if a candidate next hop list is found, but the candidate next hop list is empty, empty list manager 426 sets a flag in the candidate next hop list to indicate that the candidate next hop list was empty and sets a timer using the operating system (not shown). When the timer elapses, empty list manager 426 clears the flag. Empty list manager 426 adds the information from the beacon record to the middle or near middle of the candidate next hop list. In one embodiment, the candidate next hop list is dynamic, consisting of a head of list pointer, tail of list pointer. Empty list manager 422 creates a head-of-list pointer to the newly created entry, and a tail-of-list pointer to the newly created entry, and stores both pointers in beacon information storage 416. Entries may be linked to one another in order using a linked list, doubly liked list or an array.

If the candidate next hop list is not empty, empty list manager 426 checks the flag. If the flag is set, empty list manager 426 adds the information from the beacon record as an entry for the candidate next hop list as described above. In this manner, messages subsequent to the receipt of the message that caused the timer to be set will be added to the candidate next hop list as described above until the timer elapses as described above.

If the candidate next hop list exists, is not empty and the flag is not set, empty list manager 426 provides the pointer to the beacon record to list complete identifier 420

Determine if Candidate Next Hop List is Full.

When list complete identifier 420 receives the pointer to the beacon record, list complete identifier 420 checks the candidate next hop list corresponding to the destination in the beacon record in beacon information storage 416 as described herein, to determine if the candidate next hop list is full. In one embodiment, the candidate next hop list is full if it already contains a predetermined number of entries, such as five or ten or twenty or any other number. The number may depend on the available storage and the number of destinations that may be tracked. If the candidate next hop list is not full, list complete identifier 420 provides the pointer to list adder 422, and otherwise, list complete identifier 420 provides the pointer to cost compare manager 430, which proceeds as described herein and below.

Candidate Next Hop List not Full.

When list adder 422 receives the pointer to the beacon record, list adder 422 includes the information stored in the beacon record as an entry for the candidate next hop list, including the cost of routing through the node that sent the beacon and the signal quality with which the beacon was received, in the entry. In one embodiment, list adder 422 also deletes the beacon record from beacon information storage 416. The candidate next hop list may be the candidate next hop list corresponding to the destination.

To add the entry, if there is already a candidate next hop list stored in beacon information storage 416, list adder 422 links a new entry to the end of the candidate next hop list, for example by finding the tail-of-list pointer stored in beacon information storage 416, and adding a link from the entry indicated by the tail-of-list pointer to the new entry. List adder 422 includes in the new entry the information stored in the beacon record, including the cost of routing through the node that sent the beacon, the hop count from the beacon, the identifier of the originator of the beacon, at least the first N−1 nodes from the list of the first N nodes included with the beacon, and the signal quality with which the beacon was received. List adder 422 also changes the tail-of-list pointer to point to the newly created entry. In one embodiment, list adder 422 also deletes the beacon record from beacon information storage 416.

Candidate Next Hop List Full.

When cost compare manager 430 receives the pointer to the beacon record from list complete identifier 420 as described herein and above, cost compare manager 430 uses the tail-of-list pointer stored in beacon information storage 416 to find the last entry in the candidate next hop list, and compares the routing cost and signal quality included in that entry to the routing cost and signal quality included in the beacon record. The candidate next hop list used corresponds to the destination in the record corresponding to the pointer. If the routing cost included in the entry is much lower than the routing cost included in the beacon record, for example more than 20 percent lower, in one embodiment cost compare manager 430 deletes the beacon record from beacon information storage 416.

If the routing cost included in the last entry is much greater than the routing cost included in the beacon record, for example more than 20 percent greater, cost compare manager 430 replaces the information in that entry with the information from the beacon record, and in one embodiment deletes the beacon record from beacon information storage 416.

If the routing cost included in the entry is about the same as the routing cost included in the beacon record, for example if the two costs are within 20 percent of one another, cost compare manager 430 provides the pointer to the beacon record to signal quality compare manager 440.

As noted above, in one embodiment, if the last entry in the candidate next hop list does not have a link cost established by sending to that device, in one embodiment, cost compare manager 430 deletes the beacon record from beacon information storage 416 and does not add it to the candidate next hop list.

When signal quality compare manager 440 receives the pointer, signal quality compare manager 440 uses the tail-of-list pointer stored in beacon information storage 416 to find the last entry in the candidate next hop list, and compares the signal quality included in that entry to the signal quality included in the beacon record. If the signal quality included in the entry is much better than the signal quality included in the beacon record, for example more than 20 percent better in the embodiment that signal quality is indicated by a numerical measurement, signal quality compare manager 440 replaces the information in that entry with the information from the beacon record, and in one embodiment deletes the beacon record from beacon information storage 416. Otherwise, in one embodiment signal quality compare manager 440 deletes the beacon record from beacon information storage 416.

In one embodiment, if the last entry on the candidate next hop list does not have a link cost established by sending a message to the device to which the entry corresponds, signal quality compare manager 440 deletes the beacon record from beacon information storage and does not add it to the candidate next hop list.

Managing the Candidate Next Hop List.

Figure 5:
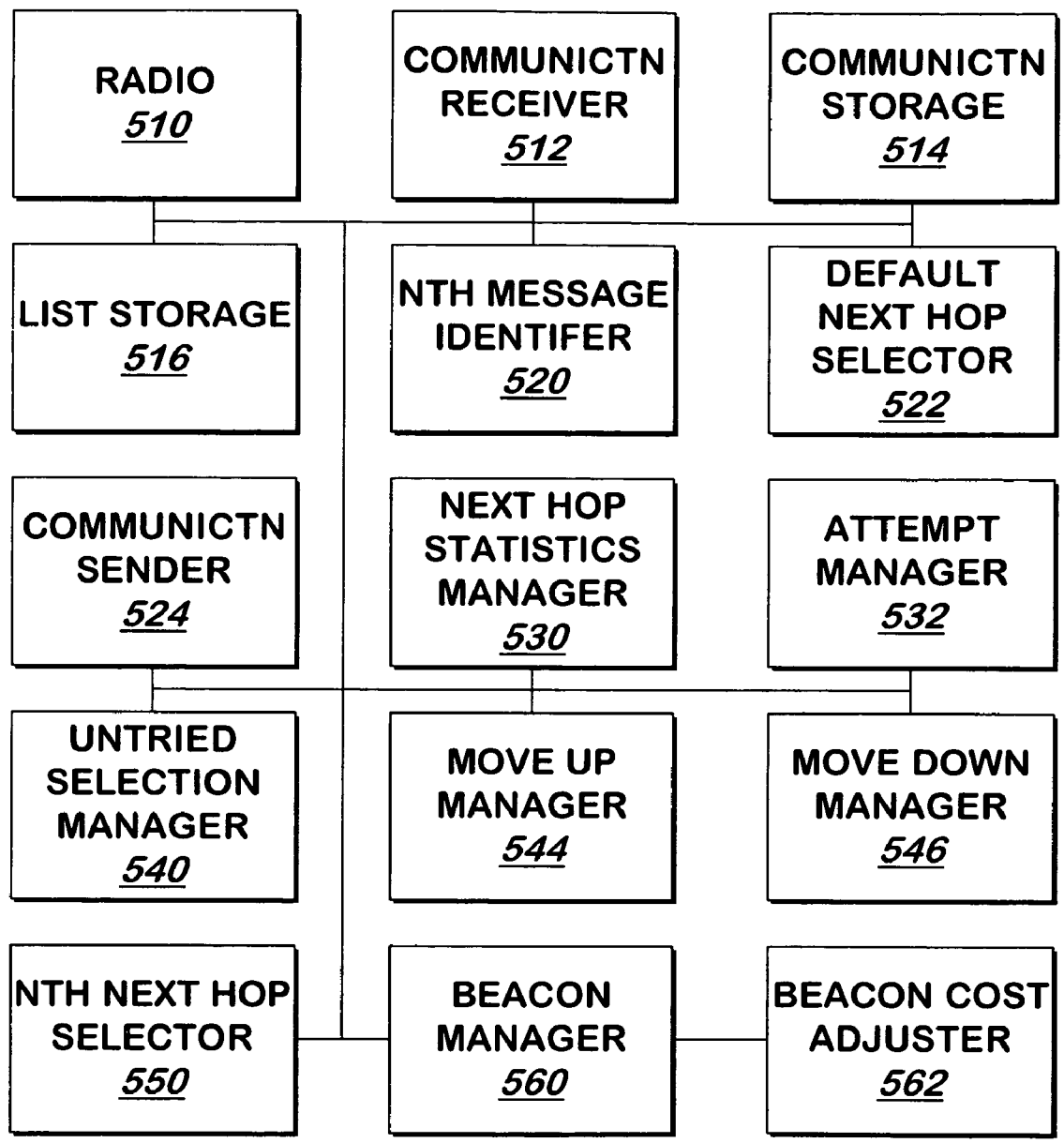
FIG. 5 is a block schematic diagram of a system for managing a candidate next hop list of entries containing routing information and routing messages using the candidate next hop list according to one embodiment of the present invention.

FIG. 5 is a block schematic diagram of a system for managing a list of entries containing routing information, and for routing messages using the list according to one embodiment of the present invention. Referring now to FIG. 5, at any time, at system start up, message receiver 512 initializes a message counter to zero, and stores the message counter in message storage 514. In one embodiment, message storage 514 includes conventional memory or disk storage. If there are multiple destinations tracked, there is a message counter for each destination tracked, and each one is initialized to zero by message receiver 512.

At any time, communication receiver 512 may receive a communication, for example from an application (not shown). The application may have received the communication for retransmission via radio 510 or the communication may have been originated by the application or another application in communication with the application. In one embodiment, radio 510 is a conventional IEEE 802.15.x-compatible radio that provides some or all of the capabilities described by one or more 802.15.x specifications. Radio 510 transmits and receives data over a wireless network, though wired networks, may also be used. Other radios and/or protocols may be used, such as the conventional 802.11a/b/g/h or other similar protocols. When communication receiver 512 receives the communication, communication receiver 512 stores the communication and the identifier of the communication (received with the communication) in communication storage 514. Communication receiver 512 also provides a pointer to the communication to Nth communication identifier 520.

Check for the Nth Communication.

When Nth communication identifier 520 receives the pointer, Nth communication identifier 520 increments the communication counter corresponding to the destination of the communication in communication storage and checks its value. If the communication counter corresponds to a multiple of a prior determined value of N, e.g. 20, Nth communication identifier 520 provides the pointer to the communication to Nth next hop identifier 550, which proceeds as described herein and below, and otherwise, Nth communication identifier 520 provides the pointer to default next hop selector 522. In one embodiment, Nth communication identifier 520 identifies as described above the next value of N to be used if the communication counter corresponds to N, and also resets the counter.

Select the Default Next Hop Node.

When default next hop selector 522 receives the pointer to the communication in communication storage 514, default next hop selector 522 initializes an attempt counter to one and stores the attempt counter associated with the communication in communication storage 514. Default next hop selector 522 also selects a default next hop node corresponding to the destination of the message. To do so, in one embodiment default next hop selector 522 may for example find a candidate next hop list matching the destination, such candidate next hop list being stored in list storage 516 and including the identifiers of next hop nodes, and for each such next hop node, the hop count, the cost of sending a communication to that node and the cost of sending a communication from that node to the gateway, along with additional information as described herein. The candidate next hop list may be created as described herein and in the related application and maintained as described herein. In one embodiment, list storage 516 includes conventional memory and disk storage. In this embodiment, default next hop selector 522 selects the first next hop node identified in the candidate next hop list as the default next hop node. When default next hop selector 522 has selected the default next hop node, default next hop selector 522 stores the identifier of the default next hop node and the identifier of the destination in communication storage 514, associated with the communication. Default next hop selector 522 also provides a pointer to the communication to communication sender 524. Because the default next hop node is thus selected near in time to when the message is received, the default node selected is the default node in effect about at the time the message is received or sent.

When communication sender 524 receives the pointer as described herein, communication sender 524 locates the communication in communication storage 514, and adds a unique sequence number to the communication if the communication does not already include a sequence number. In one embodiment, communication sender 524 also internally stores a sequence counter for each potential destination and identifier of the destination and default next hop node, and to add the sequence number to the communication, communication sender 524 uses the value of the sequence counter for the destination corresponding to the message. In this embodiment, communication sender 524 increments the sequence counter for the destination after adding the previous sequence counter value to the communication. The communication may contain the identifier of the destination to which it should be sent.

Attempt to Send Communication to Default Next Hop Node.

When communication sender 524 has added the sequence number to the communication, communication sender 524 attempts to send the communication to the next hop node corresponding to the node identifier associated with the communication in communication storage 514, for example via radio 610. In one embodiment, communication sender 524 includes with the communication a unique identifier of the node in which communication sender 524 resides, which communication sender 524 may for example receive from a system administrator and internally store.

In one embodiment, communication sender 524 includes a conventional clock, and when communication sender 524 sends a communication, communication sender 524 retains the sequence number corresponding to that communication and a timestamp of the time the communication was sent. In this embodiment, communication sender 524 periodically (e.g. every second) checks the retained sequence numbers and timestamps, and if more than a predetermined amount of time (e.g. ten seconds) has passed since a communication corresponding to any of the retained sequence numbers was sent, communication sender 524 determines that the corresponding communication has not been successfully sent.

When communication sender 524 determines that a communication has not been successfully sent, communication sender 524 provides the sequence number and identifier of the destination and identifier of the default next hop node corresponding to the communication to attempt manager 532, which proceeds as described herein and below. In one embodiment, communication sender 524 does not continue to retain the sequence number or associated information.

Attempt Successful

At any time, communication sender 524 may receive an acknowledgement to a communication from a next hop node, via radio 610. In one embodiment, acknowledgements include the node identifier and corresponding sequence number of the communication to which the acknowledgement corresponds. When communication sender 524 receives the acknowledgement, communication sender 524 compares the node identifier included in the acknowledgement to the identifier of the node in which communication sender 524 resides, and discards the acknowledgement if the two node identifiers do not match. If the node identifiers match, communication sender 524 compares the sequence number included in the acknowledgement to any retained sequence numbers, and discards the acknowledgement if the sequence number does not match a retained sequence number.

If the acknowledgement matches a retained sequence number, communication sender 524 determines that the communication corresponding to that sequence number has been successfully sent, and communication sender 524 provides the sequence number, and identifiers of the default next hop node and destination to next hop statistics manager 530 and an indication that the attempt was successful. Communication sender 524 discards the node identifier and sequence number.

When next hop statistics manager 530 receives the sequence number and identifiers from communication sender 524 because of the indication that the communication has been successfully sent, next hop statistics manager 530 locates the communication corresponding to that sequence number, next hop identifier and destination in communication storage 514. Next hop statistics manager 530 identifies the value of the attempt counter associated with that communication in communication storage 514 and, using the next hop node identifier and destination identifier, next hop statistics manager 520 locates the entry corresponding to the next hop node on the candidate next hop list corresponding to the destination in list storage 516, and in one embodiment adds the value of the attempt counter to that entry and optionally other information as described above. In one embodiment, candidate next hop list entries may include the attempt values for up to a predetermined number, e.g. five, of the last communications sent using the next hop node corresponding to that entry, and if the entry already includes that number of attempt values, next hop statistics manager 520 removes the first such attempt value and adds the most recent attempt value as the last attempt value. Next hop statistics manager 530 also determines the link cost of sending a communication to the node corresponding to the node corresponding to the entry, for example by averaging the attempt values stored in the entry as described herein. In another embodiment, no prior attempt values are stored in the entry, and next hop statistics manager 530 determines that the link cost of sending a communication to the node as the value of the attempt counter or by weighting the attempt counter and the existing link cost as described above. Next hop statistics manager 530 stores the cost of sending a communication to the node in the entry, replacing any previously stored cost of sending a communication to the node. In one embodiment, the system proceeds when a new communication is received as described herein and above.

Attempt Unsuccessful.

When attempt manager 532 receives the sequence number, and identifiers of the destination and default next hop node from communication sender 524 as described herein and above, attempt manager 532 locates the communication corresponding to that sequence number in communication storage 514 and increments the attempt counter associated with that communication. Attempt manager 532 compares the value of the newly incremented attempt counter to a predetermined threshold value, for example, five. If the value of the newly incremented attempt counter exceeds the threshold, attempt manager 532 provides a pointer to the communication and/or the identifiers of the destination to untried selection manager 540 and provides a pointer to the communication and/or the identifiers of the destination and next hop node and an indication that the attempt was unsuccessful to next hop statistics manager 530, which proceeds as described herein and below. Otherwise, if the value of the newly incremented attempt counter does not exceed the threshold, attempt manager 532 provides a pointer to the communication to communication sender 524, which repeats the process of attempting to send the communication to the next hop node as described herein and above but maintains the attempt counter value.

When next hop statistics manager 530 receives the pointer to the communication from attempt manager 532, and the identifiers of the destination and the next hop node, because attempt manager 532 included the indication that the attempt was unsuccessful, next hop statistics manager 530 locates the next hop node identifier associated with that communication in communication storage 514, and locates the candidate next hop list entry including that node identifier on the candidate next hop list corresponding to the destination in list storage 516. Next hop statistics manager 530 in one embodiment adds an attempt value to the entry, as the last attempt value in the entry, corresponding to a relatively large number, for example eight, and deletes the first attempt value included in the entry if more than the predetermined number of attempt values are already included in the entry, or weights the attempt value with the existing link cost for the entry or replaced the link cost with the attempt value as described herein and above. Next hop statistics manager 530 also determines the total cost of sending a communication to the node corresponding to the entry as described herein and above, and stores the total cost of sending a communication to the node in the entry, replacing any previously stored total cost of sending a communication to the node.

Selection of Non Default Node to Send Communication Unsuccessfully Sent.

When untried selection manager 540 receives a pointer to the communication and the destination, untried selection manager 540 uses the candidate next hop list corresponding to the destination to locate any entry that has not been marked as having been selected for this purpose before, as described above, and if such an entry is located, it marks the entry, for example with the date and time.

If it does not locate any such entry, untried selection manager 540 locates any entry, or the entry with the oldest date and time which may or may not include the entry at the head of the candidate next hop list. Untried selection manager 540 stores the identifier of the located next hop node and the identifier of the destination in communication storage 514, associated with the communication and provides a pointer to the communication and an indication that processing should resume by untried selection manager 514 to communication sender 524, which repeats the process described above, sending via the next hop node identifier associated with the communication. However, communication sender provides the indication to next hop statistics manager 530 which provides untried selection manager 514 the identifier of the destination and the identifier of the next hop node.

When it receives these items from next hop statistics manager 530, untried selection manager 514 uses the information stored in the candidate next hop list corresponding to the destination it receives and the criteria outlined above to determine whether to move the entry corresponding to the next hop node up or down as described above. If the entry should be moved up, untried selection manager 514 provides the identifier of the next hop node and the destination to move up manager 544, which moves the corresponding entry up in the candidate next hop list corresponding to the destination as described above. If the entry should be moved down, untried selection manager 514 provides the identifier of the next hop node and the destination to move down manager 546, which moves the corresponding entry down in the candidate next hop list corresponding to the destination as described above.

Nth Communication Selection of Next Hop Node.

When Nth next hop selector 550 receives the communication, using the selection criteria described above with reference to step 330 of FIG. 3A above, Nth next hop selector 550 selects an entry from the candidate next hop list corresponding to the destination associated with the communication and associates the identifier of the selected next hop node corresponding to the entry with communication corresponding to the pointer it receives, marks the selected entry, for example with the date and time, and provides a pointer to the communication and an indication that processing should resume by Nth next hop selector 550 to communication sender 524, which repeats the process described above, sending via the next hop node identifier associated with the communication. Again, the node selected in this manner will be selected using the candidate next hop list in effect at least near the time the communication was received or sent. However, communication sender 524 provides the indication to next hop statistics manager 530 which provides Nth next hop selector 550 the identifier of the destination and the identifier of the next hop node.

When it receives these items from next hop statistics manager 514, Nth next hop selector 550 uses the information stored in the candidate next hop list corresponding to the destination it receives and the criteria outlined above to determine whether to move the entry corresponding to the next hop node up or down as described above. If the entry should be moved up, Nth next hop selector 550 provides the identifier of the next hop node and the destination to move up manager 544, which moves the corresponding entry up in the candidate next hop list corresponding to the destination as described above. If the entry should be moved down, Nth next hop selector 550 provides the identifier of the next hop node and the destination to move down manager 546, which moves the corresponding entry down in the candidate next hop list corresponding to the destination as described above. As noted, the entry may not actually move down. An entry moved into the top or bottom position is one that will not be moved up or down, and so respectively.

If it determines that the entry should be moved up or down, Nth next hop selector 550 sets the flag associated with the candidate next hop list corresponding to the destination, and otherwise Nth next hop selector 550 clears the flag. When Nth message identifier 520 receives the pointer to the communication, it will first check the flag. If the flag is set, it treats the communication the same as if it were an Nth communication, and may or may not increment the communication counter.

Sending Beacons.

As described in the related application at various times, beacon manager 560 may build and send a beacon for each candidate next hop list, which it performs as described above with reference to FIG. 3D. Beacon manager 560 may send the link cost and or hop count and advertised cost of the default next hop node to beacon cost adjuster 562, which calculates the total cost and or hop count as described with reference to step 397 of FIG. 3D and provides the cost to beacon manager 560, which includes the cost in the beacon.

What is claimed is:

1. A method of using and maintaining a list of devices used to route a plurality of messages to a destination, the method comprising:

providing a list comprising a plurality of entries that are placed in an order in the list based on a criterion, wherein the list is associated with a destination and each entry in the list comprises an identifier of a device that is configured to route messages to the destination, and wherein the list includes information associated with a cost of routing messages to the destination through respective devices;

receiving a message that is to be routed to the destination;

determining whether a number count associated with the received message is within a pre-determined range of a known number, wherein the known number indicates a number of messages in a sequence that has been routed to the destination;

responsive to the number count associated with the received message being outside the pre-determined range, providing the received message to a first device associated with an identifier included in an entry in the list that is at a head of the list; and responsive to the number count associated with the received message being within the pre-determined range:

selecting an entry from the list at a position in the list that is not at the head of the list;

sending the received message to a second device that is associated with the selected entry;

identifying a cost of routing messages to the destination through the second device responsive to a number of attempts required to send the received message to the destination through the second device;

comparing the cost identified to a first cost associated with an entry immediately preceding the selected entry and a second cost associated with an entry immediately following the selected entry;

responsive to the cost identified being lower than the first cost moving the selected entry up one position on the list; and responsive to the cost identified being higher than the second cost, moving the selected entry down one position on the list.

2. The method of claim 1, wherein the selecting an entry from the list at a position in the list that is not at the head of the list further includes selecting an entry pseudo-randomly.

3. The method of claim 1, additionally comprising:

based on providing the received message to the first device, identifying a cost responsive to a number of attempts used to send the received message to the destination through the first device, and updating a cost associated with the entry that is at the head of the list using the cost identified.

4. The method of claim 1, wherein a cost associated with a selected entry is identified additionally responsive to a cost advertised by a device corresponding to the selected entry.

5. The method of claim 1, wherein the number count associated with the received message is identified as being within the pre-determined range, responsive to a number of messages having been routed to the destination using the first device.

6. The method of claim 1, additionally comprising, for a received message that is routed to the destination using the first device:

during a period of time, listening for an acknowledgement from the first device, the acknowledgement indicating successful reception and forwarding of the received message by the first device; and responsive to an acknowledgement not being received during the period of time, selecting a different entry on the list other than the entry at the head of the list, and sending the message to a device corresponding to the selected different entry.

7. The method of claim 6, additionally comprising:

identifying a cost responsive to a number of attempts made to successfully send the message to the device corresponding to the selected different entry; and updating the information about the cost associated with the selected different entry responsive to the cost identified.

8. A system for using and maintaining a list of devices that can be used to route messages to a destination, the system comprising:

a list storage component configured for storing and providing at an output a list comprising a plurality of entries that are placed in the list in an order based on a criterion, wherein the list is associated with a destination and each entry comprising an identifier of a device that is configured to route messages to the destination, and wherein the list includes information about a cost of routing messages to the destination through respective devices;

a communication receiver having an input for receiving a message that is to be routed to the destination, the communication receiver configured for providing the message at an output;

a message identifier having an input coupled to an output of the communication receiver, the message identifier configured for determining whether a number count associated with the message is within a pre-determined range of a known number, wherein the known number indicates a number of messages in a sequence that has been routed to the destination, the message identifier being further configured to provide the message via an output to a default next hop identifier input that is responsive to the number count associated with the message being outside the pre-determined range of the known number, and to a next hop selector input that is responsive to the number count associated with the message being within the pre-determined range of the known number;

the default next hop identifier having an input coupled to an output of the message identifier, the default next hop identifier configured for receiving each message with an associated number count that is outside the pre-determined range and to the list storage component for receiving at least some of the list, the default next hop identifier being further configured for selecting an entry at a head of the list, and for providing the message at an output and an identifier of a first device corresponding to the selected entry;

the next hop selector having an input coupled to the message identifier output, the next hop selector configured for receiving each message with an associated number count that is within the pre-determined range and an input coupled to the list storage component for receiving at least some of the list, the next hop selector being further configured for selecting an entry from the list at a position in the list that is not at the head of the list, and providing the message at an output and an identifier of a second device corresponding to the selected entry;

a communication sender having an input coupled to an output of the default next hop identifier and the next hop selector output, the communication sender being configured for:

receiving each message and for each received message, the identifier of the device corresponding to the selected entry, sending via an output the message to the device corresponding to the selected entry and providing at the communication sender output an indication of a number of attempts to successfully send the message; and a next hop statistics manager having an input coupled to the communication sender output, the next hop statistics manager being configured for receiving the number of attempts for the message and for identifying a cost responsive to the indication of the number of attempts required to send the message and for providing the cost at an output of the next hop statistics manager;

wherein the next hop selector input is additionally coupled to the next hop statistics manager output for receiving the cost, the next hop selector being further configured for:

comparing the cost identified to a first cost associated with an entry immediately preceding the selected entry and a second cost associated with an entry immediately following the selected entry;

responsive to the cost identified being lower than the first cost, moving, via the next hop selector output that is coupled to a list storage component input, the selected entry up one position on the list in the list storage component; and responsive to the cost identified being higher than the second cost, moving, via the next hop selector output, the selected entry down one position on the list in the list storage component.

9. The system of claim 8, wherein the next hop selector selects the entry from the list that is not at the head of the list pseudo-randomly.

10. The system of claim 8, wherein the next hop statistics manager input is additionally coupled to the default next hop identifier output and the next hop selector output for receiving the identifier of each device associated with list entries selected for each of a plurality of received messages, and the next hop statistics manager output is additionally coupled to an input of the list storage component such that the next hop statistics manager is enabled to update in the list storage component information about the cost associated with a selected list entry responsive to the cost identified for a message that is routed using the selected list entry.

11. The system of claim 8, wherein the next hop statistics manager input is coupled to a list storage component output for receiving information about cost associated with each entry on the list based on a cost advertised by a device associated with the selected entry, the next hop statistics manager configured to update the information about the cost based on information received at the next hop statistics manager input.

12. The system of claim 8, wherein the message identifier identifies each message as being associated with a number count that is within the pre-determined range, responsive to a number of messages having been routed to the destination using the first device.

13. The system of claim 8, additionally comprising:
an attempt manager having an input for receiving an acknowledgement to each of at least some of the plurality of messages identified as being associated with a number count that is outside the pre-determined range, the input being coupled to the message identifier output for receiving at least some of the messages identified as being associated with a number count that is outside the pre-determined range, the attempt manager further configured for:
listening for a period of time for an acknowledgement to a message sent from the first device, and
responsive to an acknowledgement not being received during the period of time, providing at an output the message to which an acknowledgement was not received; and
an untried selection manager having an input coupled to an output of the attempt manager for receiving messages that are associated with a number count that is outside the pre-determined range and for which no acknowledgement was received by the attempt manager, the input of the untried selection manager further coupled to a list storage component output for receiving at least a part of the list, the untried selection manager further configured for selecting a different entry other than the entry at the head of the list from the at least the part of the list and providing at an output a message to be sent and an identifier of a device corresponding to the selected different entry,
wherein the communication sender input is additionally coupled to the untried selection manager for receiving the message and the identifier of the device such that the message is forwarded to the device.

14. The system of claim 13, wherein the statistics manager is additionally configured for identifying at the statistics manager output a cost responsive to a number of attempts made to successfully send the message to the device corresponding to the selected different entry, the statistics manager further configured for updating on the list, via at an output coupled to an input of the list storage component, information about a cost associated with the selected different entry responsive to the cost identified.

15. A computer program product comprising:
a processor; and
one or more instructions encoded in a non-transitory computer-readable medium for execution by the processor, and when executed cause the processor to perform operations including:
providing a list comprising a plurality of entries that are placed in the list in an order based on a criterion, wherein the list is associated with a destination and each entry in the list comprises an identifier of a device that is configured to route messages to the destination, and wherein the list includes information associated with a cost of routing messages to the destination through respective devices;
receiving a message that is to be routed to the destination;
determining whether a number count associated with the received message is within a pre-determined range of a known number, wherein the known number indicates a number of messages in a sequence that has been routed to the destination;
responsive to the number count associated with the received message being outside the pre-determined range, providing the received message to a first device associated with an identifier included in an entry in the list that is at a head of the list; and
responsive to the number count associated with the received message being within the pre-determined range:
selecting an entry from the list at a position in the list that is not at the head of the list;
sending the received message to a second device that is associated with the selected entry;
identifying a cost of routing messages to the destination through the second device responsive to a number of attempts required to send the received message to the destination through the second device;
comparing the cost identified to a first cost associated with an entry immediately preceding the selected entry and a second cost associated with an entry immediately following the selected entry;
responsive to the cost identified being lower than the first cost moving the selected entry up one position on the list; and
responsive to the cost identified being higher than the second cost, moving the selected entry down one position on the list.

16. The computer program product of claim 15, wherein the selecting an entry from the list at a position in the list that is not at the head of the list further includes selecting an entry pseudo-randomly.

17. The computer program product of claim 15, additionally comprising one or more instructions that when executed cause the processor to perform operations including:
based on providing the received message to the first device, identifying a cost responsive to a number of attempts used to send the received message to the destination through the first device, and updating a cost associated with the entry that is at the head of the list using the cost identified.

18. The computer program product of claim 15, wherein a cost associated with a selected entry is identified additionally responsive to a cost advertised by a device corresponding to the selected entry.

19. The computer program product of claim 15, wherein the number count associated with the received message is identified as being within the pre-determined range, responsive to a number of messages having been routed to the destination using the first device.

20. The computer program product of claim 15, additionally comprising one or more instructions that when executed by the processor cause the processor to perform, for a received message that is routed to the destination using the first device, operations including:
  during a period of time, listening for an acknowledgement from the first device, the acknowledgement indicating successful reception and forwarding of the received message by the first device; and
  responsive to an acknowledgement not being received during the period of time, selecting a different entry on the list other than the entry at the head of the list, and sending the message to a device corresponding to the selected different entry.

21. The computer program product of claim 20, additionally comprising one or more instructions that when executed cause the processor to perform operations including:
  identifying a cost responsive to a number of attempts made to successfully send the message to the device corresponding to the selected different entry; and
  updating the information about the cost associated with the selected different entry responsive to the cost identified.

* * * * *